Jan. 30, 1968     R. D. REED     3,366,373

APPARATUS FOR ADDING HEAT TO GAS TURBINE EXHAUST

Filed June 21, 1965     2 Sheets-Sheet 1

INVENTOR
ROBERT D. REED

BY

ATTORNEY

United States Patent Office 3,366,373
Patented Jan. 30, 1968

3,366,373
APPARATUS FOR ADDING HEAT TO GAS TURBINE EXHAUST
Robert D. Reed, Tulsa, Okla., assignor to John Zink Company, Tulsa Okla., a corporation of Delaware
Filed June 21, 1965, Ser. No. 465,484
4 Claims. (Cl. 263—19)

ABSTRACT OF THE DISCLOSURE

The invention comprises an enclosure for confining the exhaust gas of an engine such as a gas turbine. A plurality of burners are positioned within the enclosure and are furnished with sufficient amounts of fuel. The burner tips are constructed to cause proper mixing of the exhaust gas with the fuel, so that sufficient oxyen from exhaust gas is in the presence of the burning fuel to stabilize the operation.

---

The present invention relates to apparatus for the recovery of heat from the exhaust of a gas turbine and more particularly pertains to gaseous fuel burner means for firing within a duct guiding the exhaust to heat recovery apparatus whereby the residual heat of the exhaust with the temperature raised to a higher value by the burning fuel may be utilized for the generation of steam or for other purposes such as heat exchange apparatus requiring input heat at temperatures above those of the gases as they escape from a gas turbine.

The temperature of the gases discharged by a gas turbine and after they escape therefrom may be as great as twelve hundred degrees Fahrenheit. One object of the invention is to provide fuel burning equipment for adding heat to the exhaust of a gas turbine so as to raise the temperature of the exhaust to a higher value so that the residual heat of the exhaust gases plus the heat added thereto by the fuel burning equipment may be utilized for the development of steam such as in a waste heat boiler or other heat exchange equipment.

The exhaust from a typical gas turbine contains oxygen in quantities of approximately seventy-six percent of the oxygen that is present in air. Another object of the invention is to provide fuel burner means within a duct guiding the exhaust from a gas turbine with the burner equipment designed and arranged as to provide for the firing of a gaseous fuel into the turbine exhaust without the necessity of supplying additional oxygen into the duct or into the presence of the burning gaseous fuel.

A still further object of the invention is to provide fuel burning equipment for the combustion of gaseous fuel in a closed conduit guiding the exhaust from a gas turbine wherein the gases contain approximately three-fourths of the amount of oxygen of air and wherein the temperature of the exhaust gases are as great as twelve hundred degrees Fahrenheit and the exhaust gases are at pressures above atmospheric with a fuel burning equipment so constructed as to provide for stable exothermic oxidation of the fuel even though the temperature elevation of the gaseous fuel mixed with the limited quantity of oxygen in the duct restrict the temperature elevation of the fuel mixture.

Other objects and features of the invention will be appreciated and become apparent particularly to those skilled in the art pertaining to the combustion of fuels as the present disclosure proceeds and upon consideration of the accompanying drawings taken in conjunction with the following detailed description wherein an embodiment of the invention is disclosed.

Figure 1:
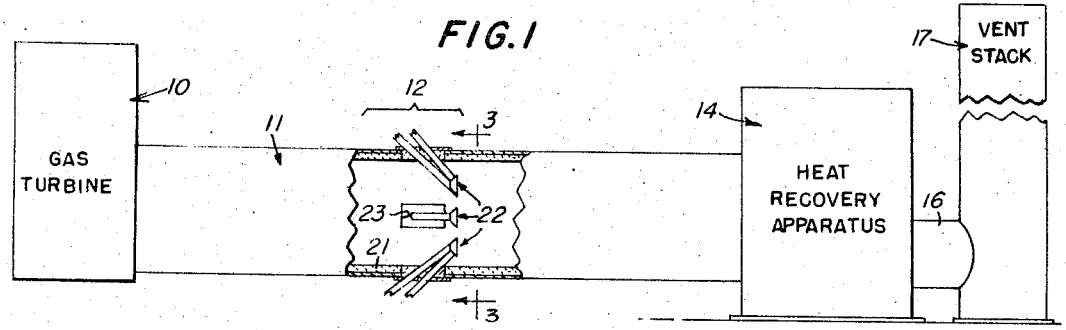
FIG. 1 is a diagrammatic view illustrating an assembly embodying the invention with a portion of the turbine exhaust duct shown in section.

The invention is directed to fuel burning equipment for elevating the temperature of the exhaust from a gas turbine diagrammatically represented at 10 in FIG. 1. The exhaust gases from the turbine are discharged into a duct 11 which is shown disproportionally large in order to illustrate the overall assembly of elements in the relationship which provides the desired result of adding heat to the exhaust gases. The fuel burning equipment hereinafter described in detail is indicated at 12 in FIG. 1 for the combustion of gaseous fuel within the duct 11 and for adding heat to the turbine exhaust. The duct extends to heat recovery apparatus shown at 14 and which may take the form of a boiler for the generation of steam or other heat exchange apparatus. The exhaust gases after the heat has been removed therefrom escape through a conduit 16 and vented to atmosphere through a stack 17. The duct and other elements for guiding the exhaust gases provide a closed conduit system excluding air and the pressure therein is above atmospheric.

The exhaust of a typical gas turbine contains carbon dioxide, water vapor, nitrogen and oxygen. The oxygen content of the exhaust is approximately seventy-six percent of air. Air as a source of oxygen for the combustion of fuel contains approximately 20.90 percent oxygen and when relied on for the combustion of fuel the flame temperature is in the neighborhood of thirty-six hundred degrees Fahrenheit. The combustion of gaseous fuel in the conduit 11 where the oxygen content is only about three-fourth of air provides a flame temperature markedly below the temperature that would be attained if the normal allotment of oxygen was available for the burning of the fuel. Thus a problem of stable burning of fuel in the presence of the turbine exhaust gas is much greater than the problem of stable exothermic oxidation of fuel in the presence of air.

In carrying out the invention the conduit 11 may be formed of any suitable metal but it is desirably lined with an insulating layer 21 formed of a suitable refractory material to reduce the rate of heat loss from the conduit system. A plurality of burner heads 22 for gaseous fuel are mounted within the duct 11 and circumferentially spaced from each other to distribute heat throughout the internal cross section of the conduit.

Figure 2:
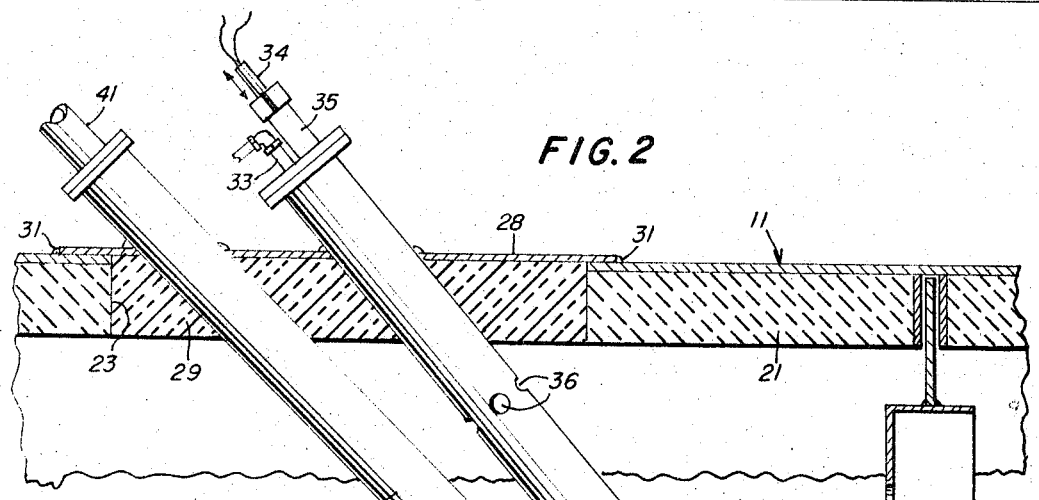
FIG. 2 is a fragmentary sectional view of the duct on an enlarged scale and illustrating one of the burner units in side elevation.
Figure 3:
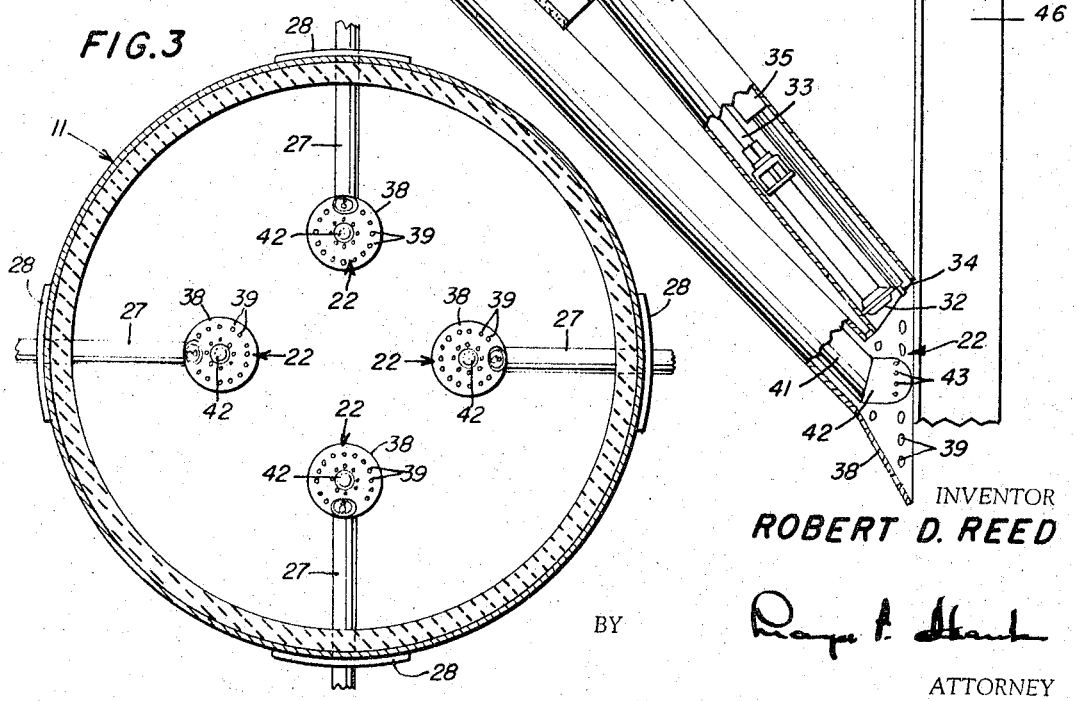
FIG. 3 is a sectional view taken on the line 3—3 of FIG. 1 and on a larger scale.
Figure 4:
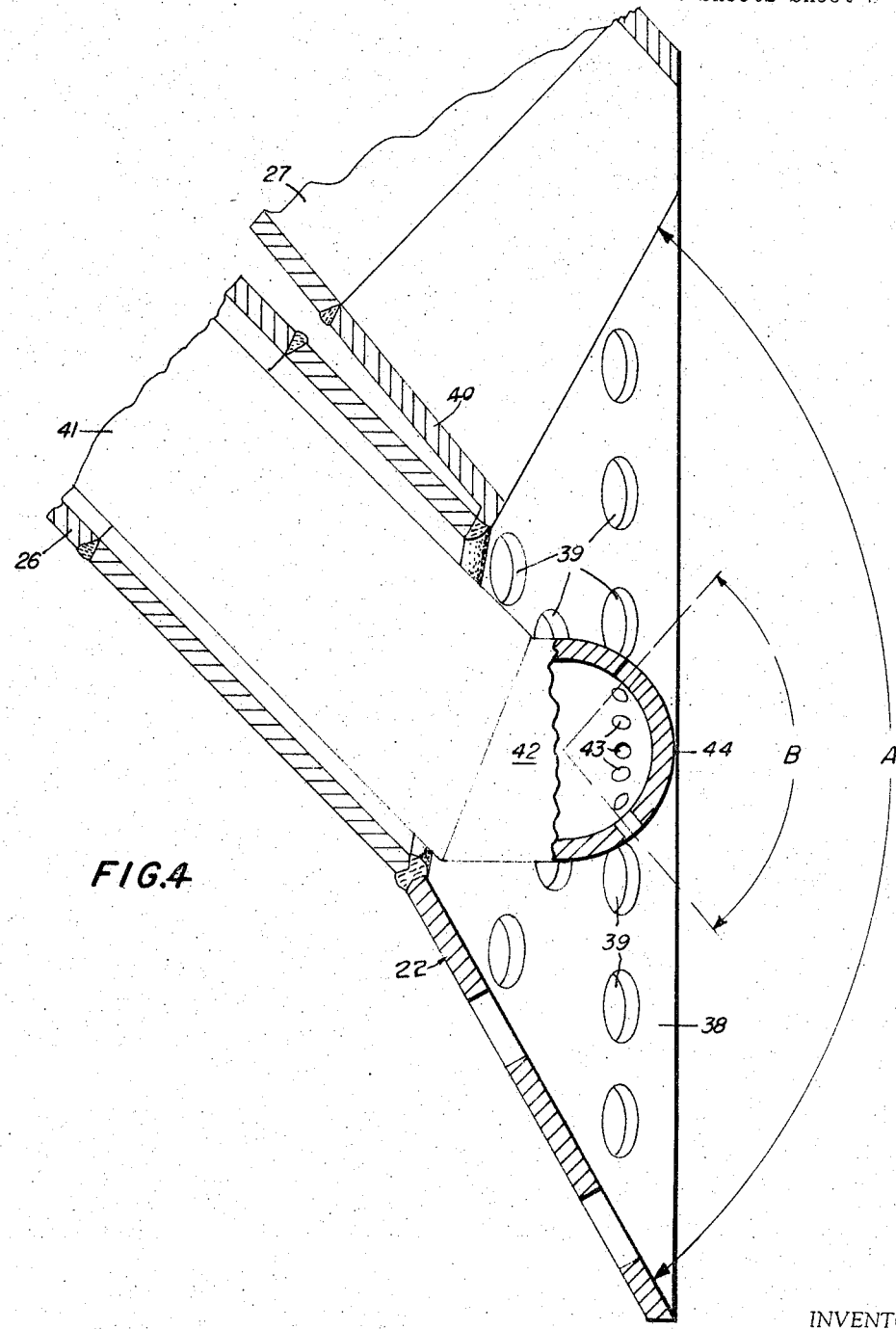
FIG. 4 is a sectional view on a highly enlarged scale showing one of the burner heads in elevation with associated elements illustrated in section.

The burner heads 22 and associated elements are of similar construction and one of such burner assemblies is shown in detail in FIGS. 2 and 4. The duct 11 is provided with a plurality of circumferentially spaced openings 23 each of which is of such dimensions as to permit one of the burner assemblies to be introduced therethrough. Each burner assembly includes a first guide tube 26 and a second guide tube 27 both of which extend through a plate 28 adapted to close one of the openings 23. The plate 28 carries a layer of insulation 29 on the inner face thereof so that when the plate is in place as shown in FIG. 2 the guide tubes 26 and 27 will be supported in proper position within the duct 11 and the opening 23 is closed. The plate 28 may be welded as indicated at 31 to the metal shell of the duct 11. When the duct 11 is of circular cross section the plates 28 are of arcuate form as shown in FIG. 3. The second guide tube 27 converges towards the first guide tube 26 in proceeding radially inwardly of the duct 11 so that the inner end of the second guide tube 27 is closely adjacent the inner end of the first guide tube 26. The second guide tube 27 accommodates a pilot burner head 32 and a gas supply pipe 33 and suitable electrical ignition means indicated at 34 is accommodated within the second guide tube 27. The electrical ignition means is guided in a sleeve 35 and may be retracted after ignition of the pilot burner head to avoid heat damage to the electrical components of the ignitor. A plurality of circumferentially spaced apertures 36 are provided in the tube 27 in order to admit exhaust gases of the turbine into the interior thereof.

A frusto-conical shaped member 38 formed of sheet material as best shown in FIG. 4 has its small diameter end attached to the free end of the guide tube 26. A portion of the frustoconical wall of the member 38 has an opening receiving the free end of a nipple 40 carried by the inner end of the second guide tube 27. The interior of the second guide tube 27 is thereby in open communication with the downstream face of the frusto-conical member 38. The pilot burner head 32 as shown in FIG. 2 is thus in position to discharge the burning fuel developed by the pilot through the frusto-conical member 38. The wall of the member 38 has openings 39 therethrough. A pipe 41 extends through the first guide tube 26 and carries a burner tip 42 at the inner end thereof located at the downstream face of and within the frusto-conical member 38. Any suitable conduit fitting may be connected to the outer end of the pipe 41 for supplying gaseous fuel thereinto. Gaseous fuel may be supplied to all of the burner units by a suitable manifold arrangement (not shown). The burner tip 42 is connected to and supported by the inner end of the pipe 41. Discharge ports 43 are provided in the tip 42 and projections of the axes of these ports diverge from each other in a conical pattern as indicated at B in FIG. 4.

The oxygen content of the exhaust gases is approximately seventy-six percent of that of air. The reduced oxygen content does not contribute to stable burning of the fuel released through the discharge ports 43. Stable burning of the fuel is attained by providing an angle A on the frusto-conical member 38 at least twenty degrees greater than the flaring angle B of the discharge ports 43 and by providing a total area for the openings 39 through the wall of the frusto-conical member 38 to admit sufficient exhaust gas to the downstream face of the frusto-conical member 38 in relation to the exhaust gases flowing around the perimeter of the frusto-conical member 38. The total area of the openings 39 is preferably ten percent of the total surface area of the frusto-conical member 38. The total area of the openings 39 may vary from eight percent to twelve percent of the surface area of the frusto-conical member 38. Another structural arrangement which serves to promote stable burning of the gaseous fuel pertains to the position of the tip 42. The nose 44 (FIG. 4) is disposed tangent to a plane defined by the large diameter end of the frusto-conical member 38.

The openings 39 and the total aggregate area thereof in relation to the unapertured area of the frusto-conical member 38 and the angular relationship of the frusto-conical member 38 (Angle A) in relation to the angular disposition of the discharge ports 43 (Angle B) and the disposition of the nose 44 of the burner tip tangentially of the base edge of the frusto-conical member 38 all function to insure the return of hot gases from the burning fuel to the area where the fuel escaping through the ports 43 is mixed with the limited oxygen available in the duct 11. The nose 44 of the burner tip 42 being disposed forwardly beyond a conventional position and with the openings 39 located to admit the turbine exhaust gas to an area along the downstream face of the frusto-conical member provides a satisfactory quantity of oxygen as a consequence of the greater volume of exhaust gas in the presence of the burning fuel to stabilize operation. Such disposition of the burner tip 42 plus the greater included angle A increases the space between the gas streams issuing through the ports 43 and the frusto-conical member. The added space and the increased total area of the openings 39 provide the required quantity of oxygen in the presence of the burner tip to insure that stable burning is initiated within the concave portion of the frusto-conical member 38. The burning is sufficiently stabilized so that when the burning fuel moves from within the frusto-conical member 38 into the main stream of the exhaust turbine gas stable burning continues until the fuel is completely oxidized.

In operation of gas turbines the rate of flow of gas in the exhaust duct varies from twenty to one hundred feet per second with the turbine and its installation. A velocity of about fifty feet per second represents the approximate minimum flow rate for satisfactory burning of gaseous fuel in the exhaust duct. In instances where the velocity is below such a flow rate a baffle 46 (FIG. 2) may be mounted in the duct 11 to provide a constriction in the cross section of the duct in the plane of the base ends of the frusto-conical members 38. The velocity of the exhaust gas is thus increased in the zone where combustion of the fuel takes place.

While the invention has been described with reference to one type of gaseous fuel burners in association with a particular type of turbine exhaust duct it will be appreciated that the structure of the burner heads may be varied and the internal cross-section of the conduit for the exhaust gases may take other shapes. Such modifications and others may be made without departing from the spirit and scope of the invention as set forth in the appended claims.

What I claim and desire to secure by Letters Patent is:

1. In apparatus for adding heat to the exhaust of a gas turbine containing approximately three-fourths of the oxygen of air, a duct guiding said exhaust gases from the turbine and excluding air from the interior of said duct, a burner tip disposed within said duct, means for supplying a gaseous fuel to said burner tip, said tip having discharge ports with the axes thereof diverging in proceeding downstream of the duct for releasing the gaseous fuel, a frusto-conical member surrounding said burner tip having a downstream facing cavity with an included angle at least twenty degrees greater than the included angle of the discharge ports, and said frusto-conical member having spaced openings therethrough with the aggregate area thereof from eight to twelve percent of the surface area of the frusto-conical member to allow a quantity of said exhaust gases to the presence of said tip to support stable combustion of the gaseous fuel.

2. In apparatus for adding heat to the exhaust of a gas turbine containing approximately three-fourths of the oxygen of air in accordance with claim 1 including a plurality of said burner tips within said duct and circumferentially spaced from each other therewithin.

3. In apparatus for adding heat to the exhaust of a gas turbine containing approximately three-fourths of the oxygen of air according to claim 1 including a baffle within said duct in the vicinity of the burner tip providing a constriction in the duct adjacent the burner tip.

4. In apparatus for adding heat to the exhaust of a gas turbine containing approximately three-fourths of the oxygen of air in accordance with claim 1 including a pilot burner head positioned adjacent said burner tip and means for supplying a gaseous fuel to said pilot burner head.

References Cited

UNITED STATES PATENTS 2,685,168  8/1954  Malick _____ 60—39.74
3,064,720  11/1962  Keating et al. _____ 263—19

FREDERICK L. MATTESON, Jr., *Primary Examiner.*

JOHN J. CAMBY, *Examiner.*